Dec. 13, 1938.  J. E. BLOSSER ET AL  2,139,796
STACKING MECHANISM
Filed Nov. 1, 1934
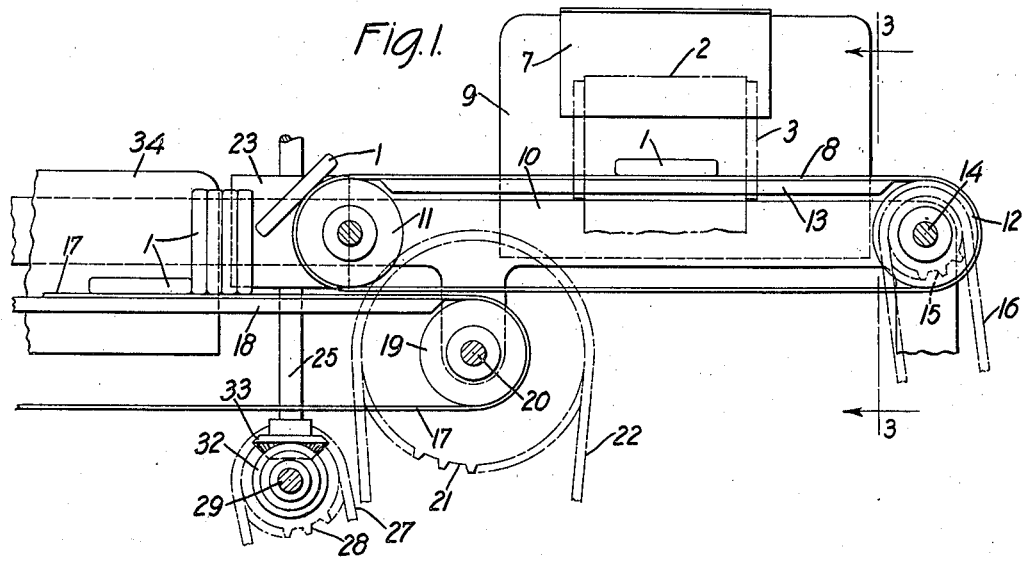
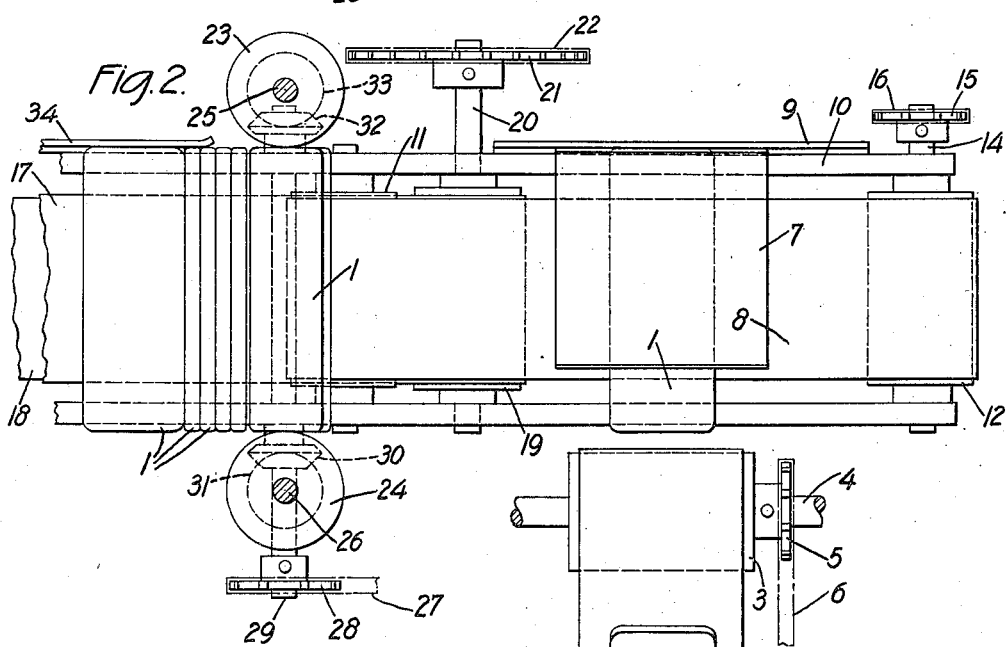
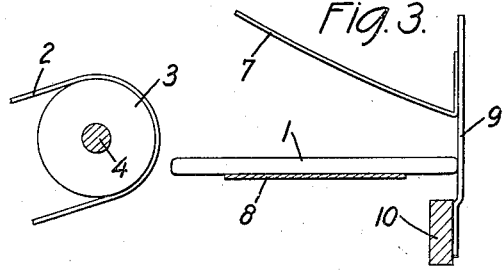
INVENTOR.
John E. Blosser
and Paul Burke.
BY Moses & Nolte
ATTORNEYS.

Patented Dec. 13, 1938

2,139,796

UNITED STATES PATENT OFFICE 2,139,796

STACKING MECHANISM

John E. Blosser, Glens Falls, and Paul Burke, South Glens Falls, N. Y., assignors to Veldown Company, Inc., New York, N. Y., a corporation of New York Application November 1, 1934, Serial No. 750,993

2 Claims. (Cl. 198—35)

This invention relates to a delivering mechanism for delivering wrapped articles from a wrapping mechanism, the purpose being to arrange the articles on edge and in contiguous relation and to cause them to travel slowly as they accumulate so that an attendant may conveniently remove them in groups for placing them in packages. The invention, in its preferred embodiment, is designed to be used in conjunction with a machine for manufacturing sanitary napkins as disclosed in the pending application of Harrison R. Williams, Serial No. 354,074, filed April 10, 1929, for Absorbent pad, methods and apparatus for manufacturing same, and United States Letters Patent to Harrison R. Williams No. 1,973,737, granted September 18, 1934, for Method and apparatus for making catamenial bandages.

In leaving the end flap folding mechanism of said Williams patent, the pads are carried endwise by a rapidly moving conveyor, the space intervening between successive endwise arranged pads being substantially greater than the length of a pad. In accordance with the present invention the pads are delivered by the rapidly moving conveyor onto a transverse conveyor which travels at slower speed, carries the pads sidewise, but still with spaces intervening between successive pads. The pads pass from the latter conveyor downward onto a conveyor travelling at considerably slower speed, being set on edge by the transfer from the upper to the lower conveyor. The lower conveyor travels at a much slower speed than either of the others, progressing only a distance corresponding substantially to the thickness of a pad for each pad delivered.

It is a feature of the invention that provision is made of driven side guiding rollers at opposite sides of the last mentioned conveyor which form in effect a travelling chute for aligning the pads as they pass from the upper conveyor to the lower conveyor.

Other objects and advantages will hereinafter appear.

In the drawing forming part of this specification:

Fig. 1 is a fragmentary, sectional, side elevation of a machine embodying features of the present invention;

Fig. 2 is a fragmentary, horizontal, sectional view illustrating substantially the same mechanism shown in Fig. 1; and Fig. 3 is a detail, sectional view taken on the line 3—3 of Fig. 1 looking in the direction of the arrows.

Each sanitary napkin 1, as delivered by the napkin forming and folding part of the apparatus, comprises a pad of absorbent material and a gauze wrapper having the side margins thereof folded over the pad in lapping relation, and the end flaps of the gauze then folded over against the upper face of the pad as the same is viewed in Fig. 2. The pads leave the end flap folding part of the machine upon an upwardly inclined high speed conveyor 2, which is driven through an end roller 3, a shaft 4, a sprocket 5, and a chain 6. The pads are thrown from the delivery end of conveyor 2 with substantial velocity and are deflected downward by a deflector plate 7 onto a second conveyor 8 which is located below the upper stretch of the conveyor 2 and which travels at slower speed than the conveyor 2. Each pad is arrested by engagement of its leading end with a stop plate or guide 9 which is mounted on a frame member 10 of the machine.

The conveyor 8 runs upon end rollers 11 and 12 and has its upper or active stretch supported by a table 13. The conveyor 8 is driven by the end roller 12, the shaft 14 of said end roller having fast thereon a sprocket 15 of which is driven by a chain 16. The pads are carried sidewise by the conveyor 8 in spaced relation and are caused successively to pass off of the end of the conveyor 8 as the conveyor travels around the roller 11. As an incident of passing off of the conveyor 8 the pads are tilted to an upright position so that they are caused to be stacked face to face and supported on edge upon a slow moving conveyor 17.

The conveyor 17 has its active stretch supported on a table 18 and is driven through an end roller 19, a shaft 20, a sprocket 21, and a chain 22. The conveyor 17 advances continuously and through a distance corresponding substantially to the thickness of a pad for each pad delivered.

The nature of the delivery of the pads from the conveyor 2 to the travelling conveyor 8 is such that the pads are apt to become skewed or somewhat misplaced laterally of the conveyor 8. For the purpose of realigning the pads provision is made of side rollers 23 and 24, which revolve about the vertical axes of shafts 25 and 26, respectively. The rollers 23 and 24 travel at the same speed, the peripheral speed of the rollers being slightly greater than the linear speed of the conveyor 17. The rollers 23 and 24 form, in effect, a guiding or an aligning chute for the pads as they pass off of the conveyor 8. The driving mechanism for the rollers 23 and 24 comprises a chain 27 which drives a sprocket 28 fast upon a horizontal shaft 29. The shaft 29 has fast upon it a bevel pinion 30 which meshes with a similar pinion 31 fast upon the shaft 26. The shaft 29 also has fast upon it a bevel pinion 32 which meshes with a similar pinion 33 fast upon the shaft 25.

A vertical guide plate 34 extends parallel to the direction of travel of the conveyor 17 and in a plane substantially tangent to the roller 23. Should the attendant observe that the pads have not been sufficiently well aligned by the rollers 23 and 24, he may jog the pads against this guide plate 24 for the purpose of aligning them before removing them from the conveyor 17.

We have described what we believe to be the best embodiment of our invention. We do not wish, however, to be confined to the embodiment shown, but what we desire to cover by Letters Patent is set forth in the appended claims.

We claim:

1. In a machine for delivering articles, in combination, a conveyor for advancing the articles sidewise in spaced and timed relation, a second conveyor in alignment with but below the first, means for driving the second conveyor at a speed to cause the articles delivered from the first conveyor to stand on edge in face to face relation, a pair of side rollers at opposite sides of the second conveyor and spaced apart a distance corresponding substantially to the length of one of the articles for aligning the articles as they pass to the second conveyor, and means for driving said side rollers.

2. In a machine for delivering elongated relatively thin articles, in combination, a conveyor for advancing the articles sidewise and successively discharging them, a second conveyor moving at slower speed for receiving the discharged articles on edge and disposing them in face to face relation, a pair of guiding rollers disposed at opposite sides of the conveyors, the plane of the axes of said rollers being in substantial coincidence with the delivery end of the first conveyor, and means for rotating said rollers in unison.

JOHN E. BLOSSER.
PAUL BURKE.